Aug. 31, 1948.  E. H. GUTHIER  2,448,144
DEHYDRATER APPARATUS
Filed Oct. 25, 1943  6 Sheets-Sheet 1

INVENTOR,
ERVIN H. GUTHIER.
BY
Chas. E. Townsend
ATTORNEY.

Aug. 31, 1948.　　　　E. H. GUTHIER　　　　2,448,144
DEHYDRATER APPARATUS
Filed Oct. 25, 1943　　　　　　　　　　　　6 Sheets-Sheet 2
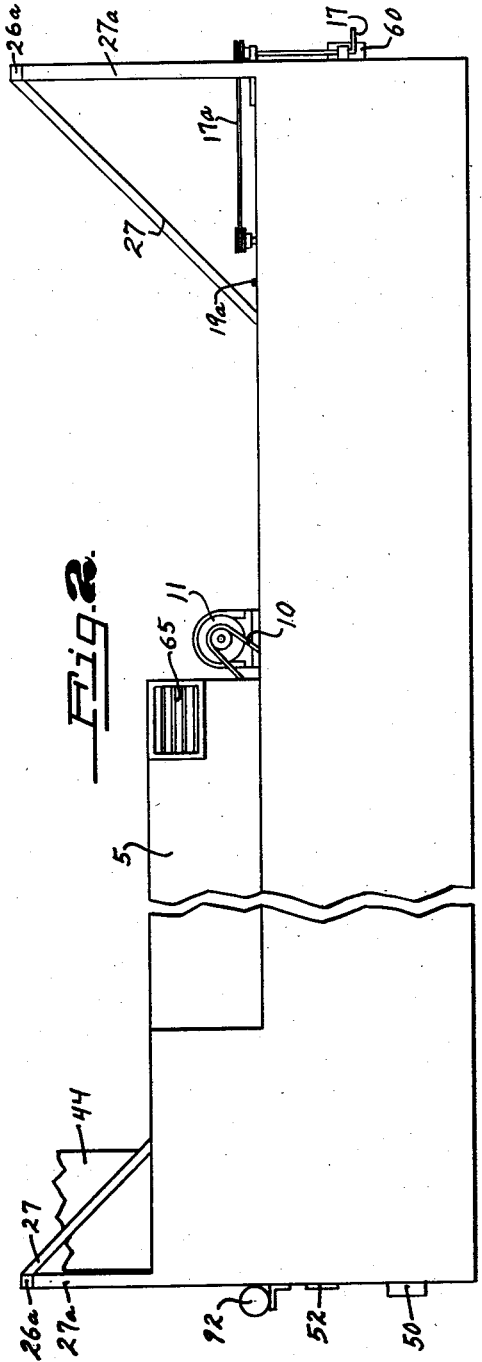
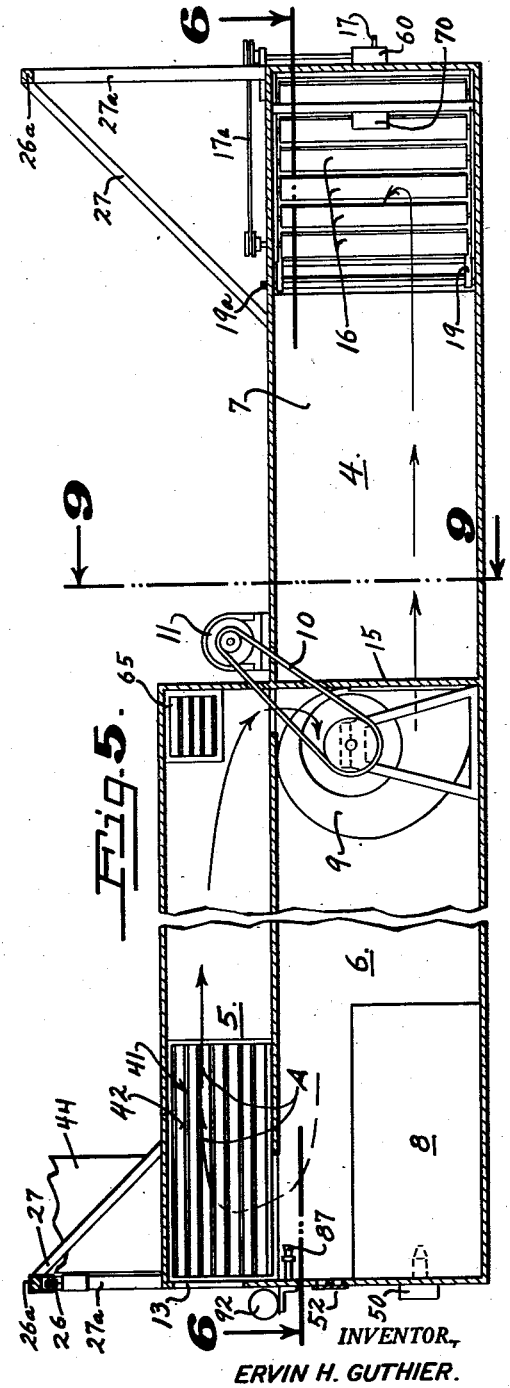
INVENTOR,
ERVIN H. GUTHIER.
BY
Chas. E. Townsend
ATTORNEY.

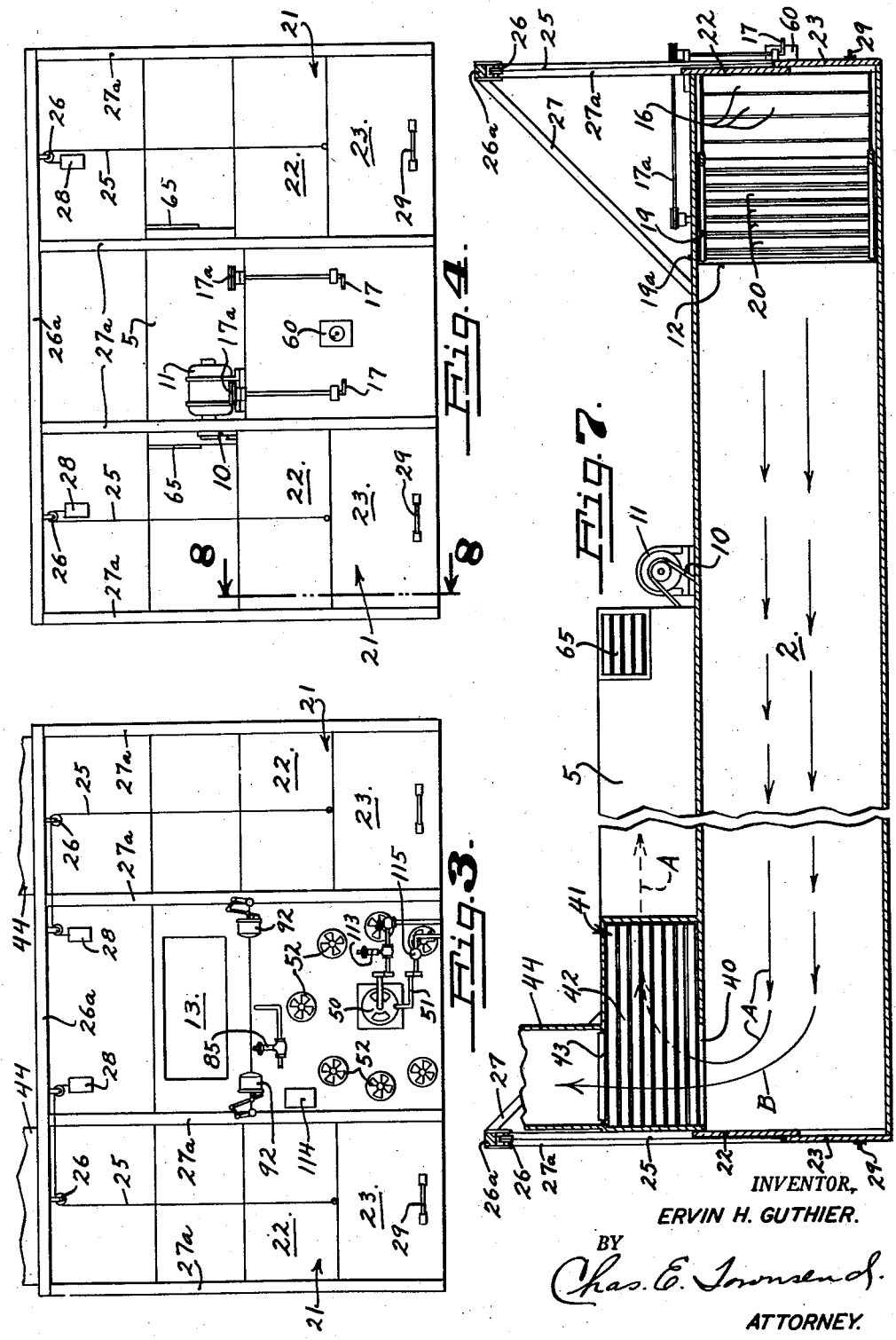

Aug. 31, 1948.  E. H. GUTHIER  2,448,144
DEHYDRATER APPARATUS
Filed Oct. 25, 1943  6 Sheets-Sheet 4
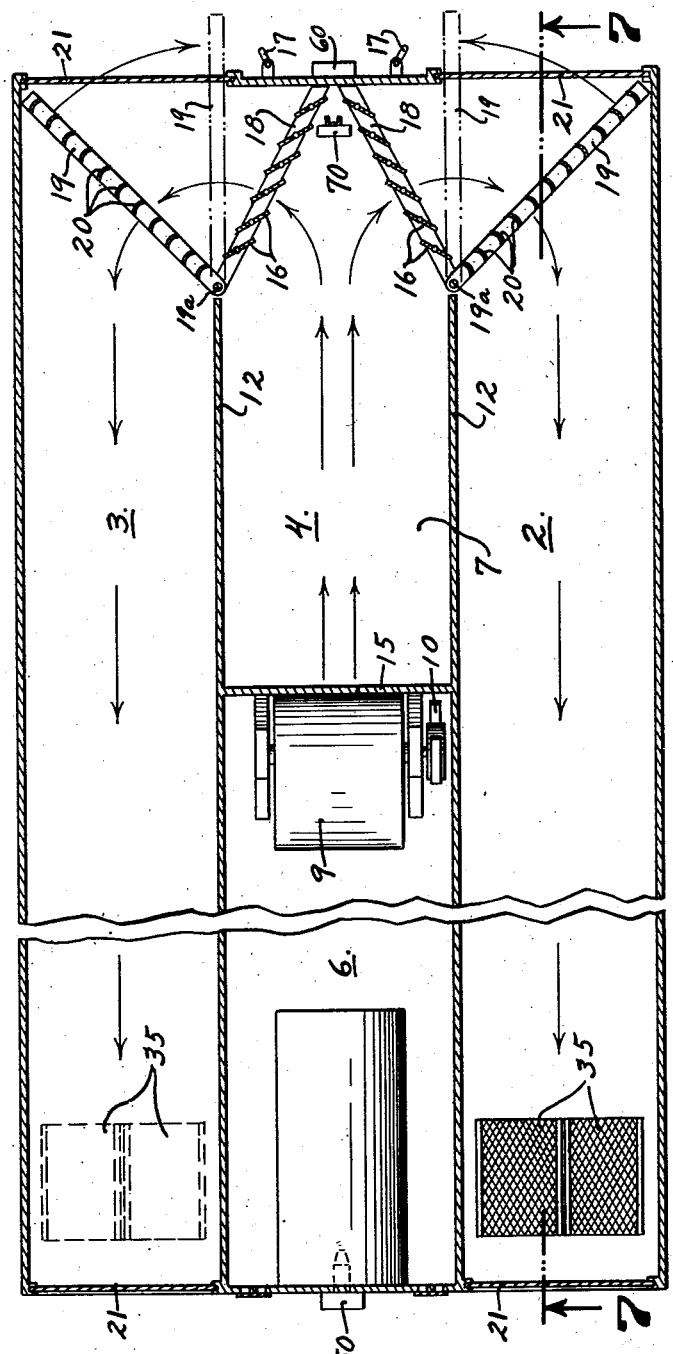
INVENTOR,
ERVIN H. GUTHIER.
BY
Chas. E. Townsend
ATTORNEY.

Aug. 31, 1948.  E. H. GUTHIER  2,448,144
DEHYDRATER APPARATUS
Filed Oct. 25, 1943  6 Sheets-Sheet 5

INVENTOR,
ERVIN H. GUTHIER.
BY
Chas. E. Townsend
ATTORNEY.

Aug. 31, 1948.  E. H. GUTHIER  2,448,144
DEHYDRATER APPARATUS
Filed Oct. 25, 1943  6 Sheets-Sheet 6

INVENTOR,
ERVIN H. GUTHIER.
BY
Chas. E. Townsend.
ATTORNEY.

Patented Aug. 31, 1948

2,448,144

UNITED STATES PATENT OFFICE 2,448,144

DEHYDRATOR APPARATUS

Ervin H. Guthier, Santa Ana, Calif.

Application October 25, 1943, Serial No. 507,525

6 Claims. (Cl. 34—46)

The present invention relates to improvements in a dehydrator apparatus of the tunnel type, and more particularly to a dehydrator apparatus which is adapted for completely automatic operation.

Generally, the object of the invention is to improve dehydrators useful in food processing. Further objects are to provide a dehydrator which is equipped with automatic processing and safety control means, whereby temperature and humidity, and the like, may be controlled positively and accurately without guesswork on the part of the operator; to provide a dehydrator wherein the drying medium, usually heated air, may be circulated or recirculated automatically selectively according to the needs of the food being processed as predetermined by the operator; to provide a dehydrator which is adapted for use in handling foods at mass production tempo; to provide a dehydrator which is designed to eliminate nearly all manual operation by an operator; and to provide dehydration means for food products adapted more completely, efficiently and quickly to dehydrate food products than heretofore has been possible.

Other objects are to provide a dehydrator having recirculation and discharge means adapted to be operated automatically in accordance with desired conditions of humidity and temperature; to provide a large capacity dehydrator which will uniformly dehydrate large volumes of foods; to provide a dehydrator equipped with means adapted to channel the drying medium uniformly and completely through the foods being processed before it is discharged or recirculated; to provide a dehydrator which is equipped with door seal means to prevent undesired escape of drying medium; and to provide a dehydrator having two tunnels; wherein both tunnels may be used simultaneously to perform two steps in dehydrating foods and the like.

Other objects and advantages will become apparent upon reference to the accompanying specification and drawings hereto annexed and made a part hereof.

In the drawings similar characters of reference represent corresponding parts in the several views.

Fig. 2 is a side elevational view of the dehydrator.

Fig. 3 is a front elevational view of the dehydrator.

Fig. 4 is an end elevational view of the back of the dehydrator.

Fig. 5 is a longitudinal sectional view, taken on the line 5—5 of Fig. 1.

Fig. 6 is a horizontal sectional view, taken on the line 6—6 of Fig. 5.

Fig. 7 is a longitudinal sectional view, taken on the line 7—7 of Fig. 6.

Figure 1:
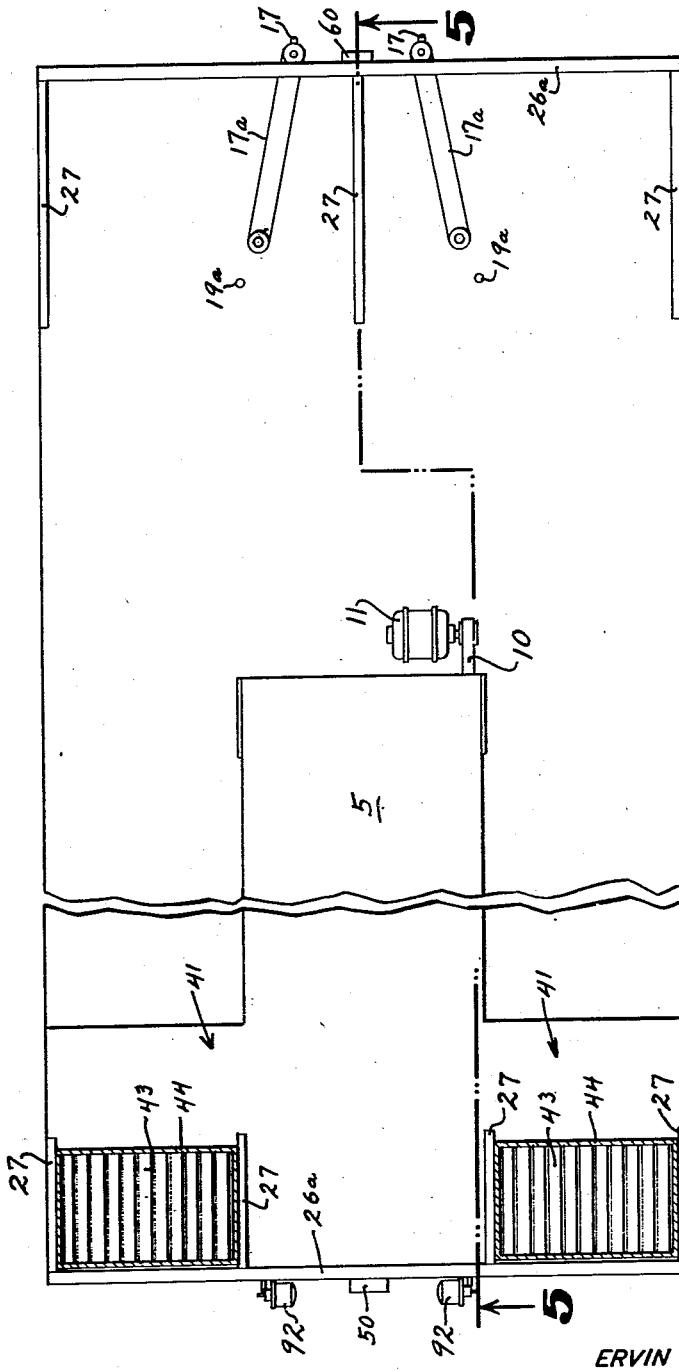
Fig. 1 is a top plan view of the dehydrator.

The dehydrator unit of the tunnel type, preferably heat-insulated throughout, consists of enclosed dehydrating tunnels, designated generally at 2 and 3, respectively, and a heating tunnel between the two dehydrating tunnels and parallel thereto, designated generally at 4. The heating tunnel comprises three portions, an elevated oven chamber 5, a lower chamber 6 (Fig. 5) and a discharge chamber 7. A conventional furnace, indicated at 8, is positioned below chamber 5, and a power fan 9, driven by a motor 11 through a belt 10 (Fig. 5), is provided in the said heating tunnel chamber 6.

An opening 13 (Fig. 3), positioned above the furnace 8, allows air or other drying medium to be drawn into the heating tunnel through chamber 6 by the fan. The air is heated by the furnace and discharged by the fan through aperture 14 in partition 15 in the direction of the arrows. Divider members 18 forming two legs of a V, the apex of the V being disposed against the back of the dehydrator and the legs veering outwardly therefrom to the drying tunnel walls 12, are provided to distribute the air discharged by the fan into the drying tunnels. The divider members are fixed in position but are provided with a plurality of adjustable baffles 16 controlled by manually operable levers 17, through link members 17ª, in order to direct the heated air into either or both of the drying tunnels. The air is directed by the divider members to air channeling gate members 19, pivoted at 19ª to the point of attachment of divider members 18 to walls 12. The members 19 are provided with fixed, spaced, vertically disposed vanes 20 (Fig. 6). It will be noted that the members 19 normally extend from the point of pivotal attachment 19ª angularly across the drying tunnels to the approximate back corners of the drying tunnels. The members are swingable to an open position (see broken lines in Fig. 6) in order to allow easy access to the drying tunnels.

It is noted that the divider members and gate members form a W-shaped, current-directing unit when the gates are in closed position (full lines in Fig. 6). It is pointed out that the outer legs of the W form a more oblique angle with respect to the adjacent V-legs than do the legs of the V per se. The air directing apparatus has proved eminently satisfactory.

The space occupied by the divider and channeling gate members will hereinafter be referred to as the directing chamber.

Figure 8:
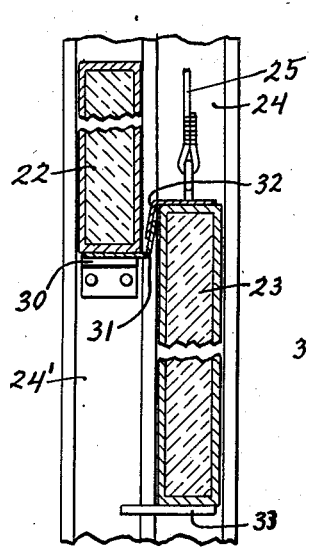
Fig. 8 is a fragmentary vertical sectional view of a detail of the door construction, as indicated by line 8—8 of Fig. 4.
Figure 9:
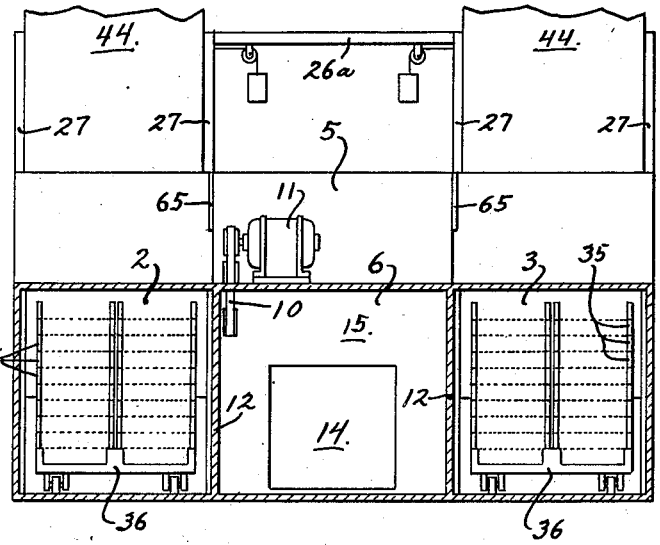
Fig. 9 is a transverse sectional view, taken on line 9—9 of Fig. 5.

To afford physical access to the interior of the dehydrator counterbalanced, vertically movable doors, generally indicated at 21, are provided at each end of each drying tunnel. Fig. 8 shows a fragmentary sectional view of a door, consisting of two portions, an upper sliding sash 22 and a lower sliding sash 23. The sashes are movable vertically in guideways 24 and 24'. Sash 23 is connected to a sash-cord or cable 25 which leads to a pulley 26 carried by an elevated member 26a supported by braces 27 and guideway stanchions 27a. The sash-cord is connected to a counterbalancing weight 28 (Figs. 4 and 9). A handle 29 is provided on each door in order to allow manual movement thereof. A stop 30 is provided in the guide passage 24' to limit the downward movement of the upper sliding sash 22. Sash 22 is also preferably counterbalanced (not shown) in the same manner as sash 23 in order to facilitate movement thereof.

On the bottom of the upper sash 22 I provide an upwardly projecting, metallic strip 31 which is bent slightly angularly outwardly from the side of the sash 22 toward sash 23. A corresponding downwardly formed strip 32 is provided at the top of sash 23 and which is adapted to nest in strip 31, substantially as shown in Fig. 8, when the sashes are in closed position. A catch 33 is provided on the bottom of sash 23 which projects into guideway 24' to engage the bottom of sash 22 and carry said sash upwardly as said sash 23 is raised and maintain sash 22 in an elevated position. This simple but effective door and seal connection prevents escape of drying medium from the dehydrating tunnels.

The food to be processed is preferably carried by a plurality of superposed, vertically spaced mesh bottom trays 35 which are, in turn, carried by wheeled dollies 36, or other suitable carriers (Fig. 9).

The recirculation and discharge means will now be described. At the front or furnace end of each drying tunnel, adjacent to the front door thereof, there is provided an opening 40 in the roofs of said tunnels leading to an auxiliary chamber, generally indicated at 41. I provide a recirculation damper 42 in the wall separating the auxiliary chamber 41 from oven chamber 6 and a discharge damper 43 in the roof of chamber 41 communicating with a chimney escape 44. The dampers are automatic, selectively and synchronously controlled by means which will shortly be described. As shown in Fig. 7, the recirculation damper, allowing communication from the dehydrating tunnels to the heating tunnel, is open, whilst discharge damper 43 is correspondingly closed. The recirculation and discharge dampers are interconnected (Fig. 10) in such a way that as a recirculation damper is opened, the related discharge damper is synchronously closed and vice versa.

From an inspection of the drawings it will be seen that air discharged through the directing chamber into the drying tunnels passes through the foods carried on trays 35 the full length of the drying tunnels to the front thereof where the air currents are then directed upwardly through opening 40 and thence either through recirculation dampers 42 to be reheated and recirculated, or through discharge dampers 43. For example, in Figs. 5 and 7 arrows A indicate the air being passed into recirculation and arrows B represent the air currents which pass through discharge damper 43.

It is very important in drying food products to control positively, accurately and uniformly the moisture content of the air or other drying medium utilized. Some foods react more favorably to a higher moisture content in the air utilized in the drying process than do others. By recirculating air which has been in contact with the foods being processed, a higher moisture content in the drying medium is obtained. On the other hand, if it is desired to reduce the moisture content of the drying medium, the recirculation dampers are closed, or partially closed, and discharge dampers are opened, or partially opened, so that the air utilized in the drying tunnels or a portion thereof is the comparatively dry air brought in through opening 13 and heated by the furnace.

By providing opening 40 at the very front of the enclosed drying tunnels in the roofs thereof, the drying medium must pass the entire distance of the heating tunnel through the foods before it can escape either to the atmosphere or into recirculation. By means of the enclosed tunnels and arrangement of divider members 18 and channeling members 19 and, to some extent, the superposed, vertically spaced food trays, together with the position of the escape opening 40, the drying medium thoroughly and uniformly contacts all of the foods being processed without creating eddies and undesirable cross currents during its complete passage through a tunnel. This is a most desirable and advantageous feature of this invention.

I have provided an adjustable louver grill 65 in the walls of chamber 5 above the position of the fan intake, substantially as indicated in Fig. 5. The purpose of the air intake grill 65 is to eliminate the turbulence and eddy currents caused by the air entering the inlets of the fan as through chamber 6. If the said adjustable intake 65 was not available, the air entering the fan from chamber 6 would be subjected to turbulence adjacent to the partition 15. Intake 65 eliminates the possibility of turbulence by allowing a certain amount of regulated outside air to flow directly to the fan to mix with the heated air from furnace chamber 6. The auxiliary intake 65 is a very important feature and greatly betters air flow conditions both to and from the fan.

Fig. 3 shows a view of the exterior of the front of the dehydrator unit, wherein the burner for the furnace is indicated at 50. The pilot flame fuel conduit is indicated at 51. A plurality of furnace dampers 52 is provided, together with a number of accessories and safety devices, such as gauges, controls and associated mechanism, which will be more fully described in connection with Figs. 10 and 11.

Fig. 4 shows the back of the dehydrator adjacent to the directing chamber. A recording controller hydrometer and thermostatic control, generally indicated at 60 and which may be set at any predetermined point of desired moisture content and temperature control, is adapted to observe, control and record the conditions of humidity and temperature within the dehydrator, through wet and dry bulb thermometer units 61 and 62 positioned in the directing chamber, as will be more fully described in connection with Fig. 10.

In drying food products, it is sometimes desirable to pass the foodstuffs through the drying tunnels parallel to the current of drying medium and then counter to the current of drying medium, or vice versa. My dehydrator is adaptable for this purpose by first passing the foods in the trays, for example, through tunnel 2 with or parallel to the flow of current, as indicated by current arrows in Fig. 6, and then removing the said foods from tunnel 2 and passing it through tunnel 3 against or counter to the flow of the drying medium, as indicated by the current arrows in Fig. 2. In this way a more thorough and efficient drying of the foods may be accomplished.

I have further provided, by means of the adjustable baffles in divider members 18, a way of closing off access of drying medium to one tunnel while maintaining the flow of drying medium to the other tunnel. In this manner a relatively small volume of foodstuffs may be handled in a more efficient and fuel-saving way than if both tunnels were operating but only one of which could handle the volume of foods being processed.

Figure 10:
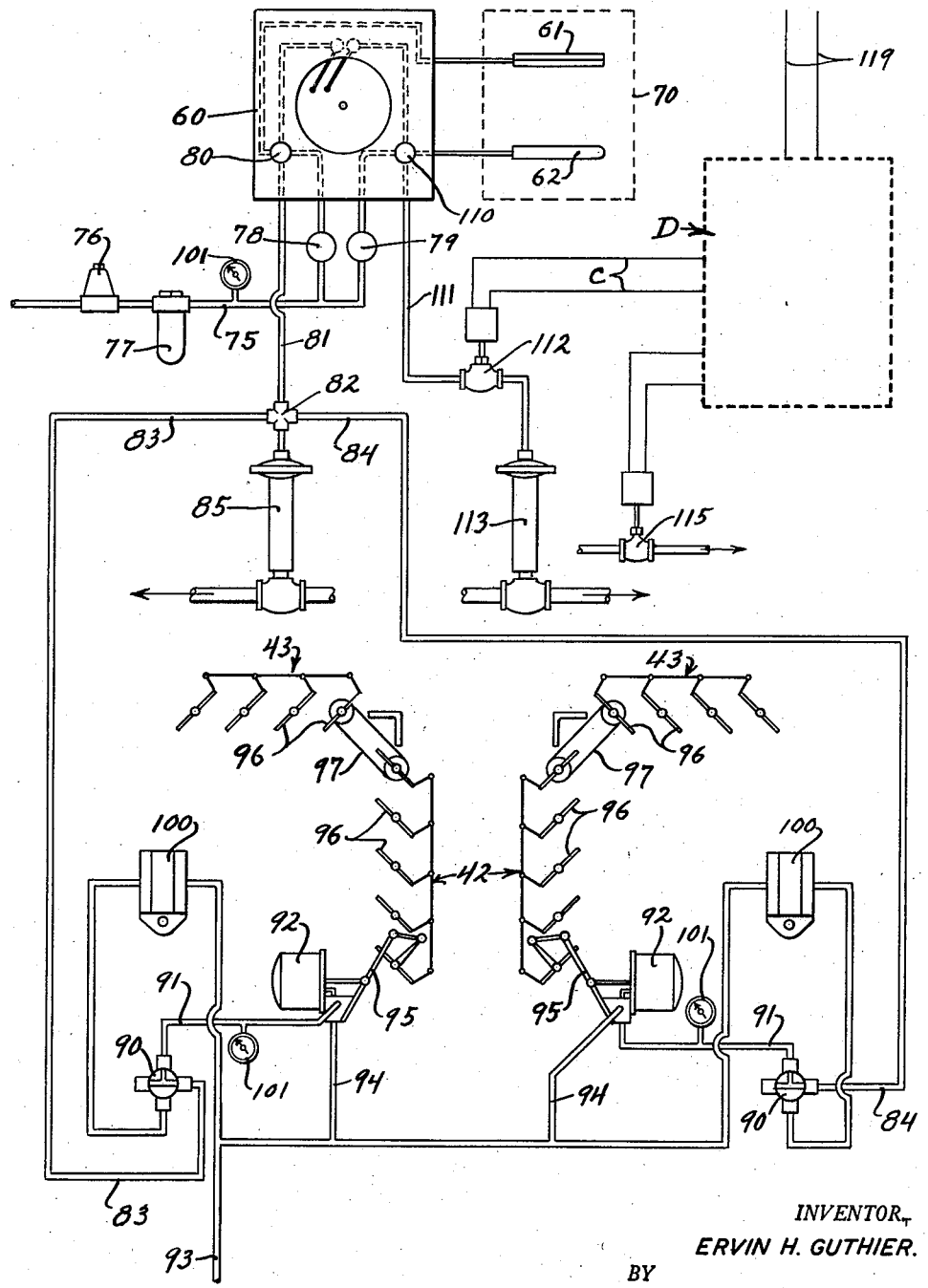
Fig. 10 is a diagram of the pneumatic controls circuit.

Diagrammatic Fig. 10 will now be discussed. The master controller, generally indicated at 60, is provided with wet and dry bulb thermometer units 61 and 62, which are suitably connected to the controller and mounted on a panel positioned within the dehydrator, as at 70 (Fig. 6). The controller automatically records and controls the temperature within the dehydrator, as well as the moisture content of the drying medium.

Air under pressure, from a suitable source is conveyed through a pneumatic conduit inlet 75 to the controller 60. The conduit is provided with a conventional regulator valve 76, an air filter 77, and shut-off valves 78 and 79. The control mechanism within the controller is adapted to be set at a predetermined point of moisture content and temperature control, as desired by the operator or dictates of circumstance or conditions of operation.

When the moisture content of the drying medium, as recorded by the wet bulb unit, exceeds or is less than the desired predetermined point, the controller apparatus actuates a valve 80, thereby putting pneumatic pressure into line 81 which leads to a diverter valve 82 which is connected to branch lines 83 and 84 and a humidifier valve 85, provided with a diaphragm, which controls a humidifier in chamber 6, such as a steam nozzle shown at 87 in Fig. 5. It may be noted that a manual control (not shown) may be employed to cut off communication to either of the lines 83 or 84, as desired. The air pressure in lines 83 and 84 is conveyed to a diverter switch 90 and from there, through a line 91, to a damper relay mechanism in the damper motor apparatus 92 which allows the main air supply, through conduit 93 and branch conduits 94, to operate the pneumatic damper motor 92, which, in turn, actuates, through appropriate linkage 95, the pivotally mounted baffles 96 in recirculation dampers 42 and discharge dampers 43.

It is noted that the dampers 43 and 42 are appropriately connected by linkage, generally indicated at 97, so that as the recirculation damper baffles are being closed the discharge dampers are synchronously being opened, and vice versa. The source conduit 93 is connected to any suitable supply of air under pressure.

If the drying medium in the dehydrator is extremely dry and not enough moisture is added to the air by means of recirculation thereof, the controller, set at a predetermined point of desired moisture content, allows pneumatic pressure through line 81 to keep the recirculation dampers open and the discharge dampers closed and simultaneously exerts sufficient pressure against the diaphragm of humidifier valve 85 to actuate the said valve and, in turn, actuate the humidifier 87 in order to supplement the moisture in the drying medium to bring the humidity thereof up to the desired controller setting. On the other hand, if the moisture content in the dehydrator is above the predetermined controller setting, the valve 80 is opened and pneumatic pressure actuates the damper motor, closing or partially closing the recirculation dampers and correspondingly opening the discharge dampers until such time as the balance point, that is, the controller setting point, is reached. In this way the humidity of the drying medium is kept automatically at a constant point by synchronous movement of the discharge and recirculation dampers and the supplemental effect of humidifier 87.

As a safeguard, an auxiliary manual remote rheostatic control switch 100 is provided to control the damper motors in the event the automatic or controller circuit is out of repair. The manual circuit is opened through the switch 100, allowing air under pressure in line 93, connected to a suitable source of air under pressure, access to switch 100 and thence through diverter valve 90, through line 91 to actuate the relay mechanism and allow working pressure in line 94 to operate the damper motor. The damper motor operates the recirculation and discharge dampers, as desired, by manual rheostatic control of the said switch 100 in the same manner as when operated automatically by the controller 60.

Pressure gauges 101 are provided on several of the lines in order to keep an accurate check on the pressure in the various conduits.

The controller 60 records and controls the thermostatic conditions within the dehydrator through the medium of the dry bulb unit 62. The desired temperature within the dehydrator may be controlled at a predetermined point by means of adjustment of the controller, as in the case of humidity, and when the temperature in the said dehydrator falls below or climbs above the point of setting, a valve 110, similar to the valve 80, already referred to, is opened, allowing pneumatic pressure access to line 111 and thence to an electric pneumatic valve 112 to a gas valve 113 which controls the gas burner of the furnace. Valve 112 is connected to electrical lead lines C leading to the electrical control circuit, generally indicated at D.

For example, if the air or drying medium temperature in the dehydrator is less than the controller point, valve 110 is automatically opened, actuating the gas valve, allowing additional gas to be utilized in the furnace and thereby raising the temperature. On the other hand, if the temperature in the dehydrator is higher than the controller point, the flow of gas is cut down proportionately in order to lower the temperature.

Figure 11:
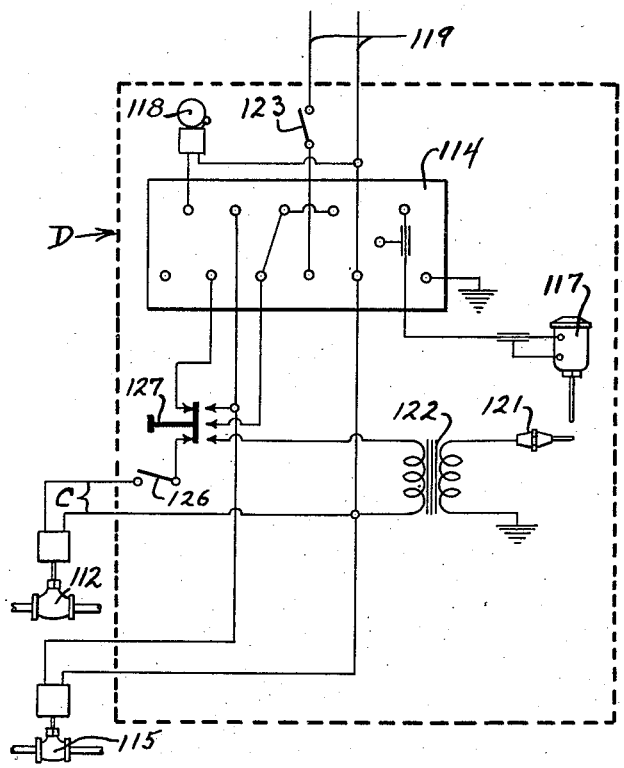
Fig. 11 is a diagram of the electrical controls circuit.

Diagrammatic Fig. 11 shows the electrical hook-up for the automatic controls utilized in the dehydrator. The flame protection unit 114 is designed to reduce to a minimum the possibility of explosion. It controls both the pilot flame solenoid valve 115, which controls the flow of gas to the pilot burner (not shown) and the electric pneumatic valve 112 through the medium of an electrode 117, positioned across the pilot flame (not shown) so that if the pilot flame is extinguished for any reason the protection unit will close the pilot valve 115, as well as the electric-pneumatic valve to cut off flow of gas to the furnace. It also closes the alarm circuit to operate an alarm bell 118.

Electric source lead lines 119 furnish electric power for the various control units through leads shown in the drawings. The flame protection unit has a conventional time delay device (not shown) to allow a period of time sufficient to purge all gas from the dehydrator from the time the fan motor is started until the pilot valve 115 opens. The protection unit also controls the pilot flame ignition circuit, generally indicated at 121 and including transformer 122, and will not allow the electric-pneumatic valve 112 to open to feed gas to the furnace through valve 113 (Fig. 10) until the pilot flame has been started and is functioning properly.

I also provide an air flow switch 123, located in the path of the air stream generated by the fan which is electrically operated. The air flow switch is a conventional apparatus designed to close the alarm circuit when the air current from the fan fails. If the fan motor stops or the fan belt breaks, the air flow stops, thus breaking the electric circuit with the electric-pneumatic valve which, in turn, cuts off gas to the burner. It also closes the alarm circuit to sound the alarm 118.

I also provide a high temperature limit switch 126, which is simply a thermostatic dry bulb controller electrically operated. It is connected to the electric-pneumatic valve 112. Usually I prefer to set the high temperature switch five degrees to ten degrees above the operating temperature of the wet and dry controller 69, so that if the said controller fails to operate for any reason, the switch 126 will break the electric circuit with the electric-pneumatic valve, thereby shutting off the gas supply to the furnace.

A dual push-button switch 127 is provided in the control circuit for two consecutive safety operations. When the button is pushed in, contact is made with the high voltage transformer 122, and electric ignition through 121 is provided to light the pilot flame 51, and, if a successful lighting of the pilot flame is accomplished a visual signal light in the flame protection unit 114 is extinguished. When the push-button is released to its normal position, after a successful ignition operation, it opens the electric-pneumatic valve 112, thus supplying air pressure to the gas valve 113, which, in turn, opens gas valve 113. If the electric ignition operation is not successful, when pushing the button in, then the visual signal light will not be extinguished and the electric-pneumatic valve 112 will not open when the push-button is released to its normal position.

It will be noted that if any of the above circuits connected into the electric-pneumatic valve 112 are opened, the pneumatic pressure therethrough to the gas valve 113 (Fig. 10) is shut off, thereby cutting off the supply of gas to the burner.

The units comprising my control system are all conventional apparatus available on the open market. The novel and useful arrangement of such units as applied to my dehydrating apparatus, as herein described and illustrated, make it possible to process foods in a manner reduced to scientific accuracy. A better quality food product is obtained with much less labor and operating costs than heretofore known and with a greater degree of safety. Large volumes of food products may be easily and efficiently processed at mass production tempo.

While I have described my apparatus in more or less detail of embodiment, it is understood that various modifications and alterations may be made within the spirit of the invention and the scope of the appended claims.

I claim:

1. A dehydrating apparatus comprising a plurality of enclosed drying tunnels, a heating tunnel, means to heat a drying medium in said heating tunnel, means to impart circulatory movement to said drying medium, a directing chamber at one end of said apparatus in flow communication with said drying tunnels and said heating tunnels, fixed divider members having adjustable baffles positioned in said directing chamber, said divider members adapted to direct drying medium issuing from the heating tunnel to said drying tunnels, movable channeling members having fixed baffles positioned in said chamber each of said channeling members movable across the intake end of a drying tunnel, each of said divider members adaptable to close off communication between said heating tunnel and a drying tunnel, and means to recirculate and discharge selectively and synchronously said drying medium, said last mentioned means positioned in said tunnels adjacent the ends thereof opposite to said directing chamber and comprising automatically controlled damper units acting in synchronized movement with respect to one another.

2. A dehydrating apparatus comprising a plurality of enclosed drying tunnels, a heating tunnel, means to heat a drying medium in said heating tunnel, means to impart circulatory movement to said drying medium, a directing chamber at one end of said apparatus in flow communication with said heating tunnel and said drying tunnels, fixed divider members having adjustable baffles positioned in said directing chamber, movable channeling members having fixed baffles positioned in said chamber, said divider members disposed in the shape of a V, the apex of said V being positioned adjacent the end wall of said directing chamber, each of said channeling members pivoted adjacent an end of a said divider member and swingable across a drying tunnel, and means to recirculate and discharge selectively said drying medium comprising automatically controlled damper units acting in synchronized movement with respect to one another.

3. A dehydrating apparatus comprising a plurality of enclosed drying tunnels, a heating tunnel, means to heat a drying medium in said heating tunnel, means to impart circulatory movement to said drying medium, a directing chamber at one end of said apparatus in flow communication with said heating tunnel and said drying tunnels, discharge conduits in flow communication with said drying tunnels adjacent to the ends thereof opposite to said directing chamber, divider members in said directing chamber disposed in the shape of a V, the apex of said V being positioned adjacent the end wall of said chamber and the legs of said V veering outwardly from said wall toward said heating tunnel, channeling members pivoted adjacent the ends of said divider members and swingable across said drying tunnels whereby said divider members and channeling members form a W-shaped directing apparatus when said channeling members are moved across said tunnels, adjustable baffles in said divider members, and fixed spaced vertically disposed baffles in said channeling members, said baffle members adapted to control the flow of drying medium issuing from said heating tunnel into said drying tunnels.

4. A dehydrating apparatus comprising a plurality of enclosed drying tunnels, a heating tunnel, means to heat a drying medium in said heating tunnel, means to impart circulatory movement to said drying medium, a directing chamber at one end of said apparatus in flow communication with said drying tunnels and said heating tunnel, fixed divider members having adjustable baffles positioned in said directing chamber, said divider members adapted to direct drying medium issuing from the heating tunnel to said drying tunnels, movable channelling members having fixed baffles positioned in said chamber, each of said channelling members movable across the intake end of a drying tunnel, each of said divider members adaptable to close off communication between said heating tunnel and a drying tunnel, means to recirculate and discharge selectively and synchronously said drying medium, said last mentioned means positioned in said tunnels adjacent to the ends thereof opposite to said directing chamber and comprising automatically controlled damper units acting in synchronized movement with respect to one another, and auxiliary air inlet means positioned adjacent to said circulatory means to allow unheated air access to said circulatory means.

5. A dehydrating apparatus comprising a plurality of enclosed drying tunnels, a heating tunnel, means to heat a drying medium in said heating tunnel, means to impart circulatory movement to said drying medium, a directing chamber at one end of said apparatus in flow communication with said heating tunnel and said drying tunnels, fixed divider members having adjustable baffles positioned in said directing chamber, movable channelling members having fixed baffles positioned in said chamber, said divider members disposed in the shape of a V, the apex of said V being positioned adjacent to the end wall of said directing chamber, each of said channelling members pivoted adjacent to an end of a said divider member and swingable across a drying tunnel, means to recirculate and discharge selectively said drying medium comprising automatically controlled damper units acting in synchronized movement with respect to one another, and auxiliary air inlet means positioned adjacent to said circulatory means to allow unheated air access to said circulatory means.

6. A dehydrating apparatus comprising a heating tunnel, a main air inlet provided in the forward end of said heating tunnel, a drying tunnel, a heating unit in said heating tunnel to heat a drying medium, means in said heating tunnel to impart a circulatory movement to said drying medium, means to direct said drying medium from the heating tunnel to the drying tunnel, a chamber positioned above said drying tunnel and in flow communication therewith, means defining a port providing communication between said chamber and said heating tunnel, a recirculation damper in said port to close off communication between said drying tunnel and said heating tunnel through said chamber, a discharge port and damper in said chamber adjacent to said recirculation damper, and auxiliary air inlet means provided in said heating tunnel and spaced rearwardly from said main air inlet and positioned adjacent to the drying medium inlet opening of said circulatory means to allow unheated air entering said heating tunnel through said auxiliary air inlet means direct access to said circulatory means to mix with heated air circulated by said circulatory means.

ERVIN H. GUTHIER.

REFERENCES CITED

The following references are of record in the file of this patent:

UNITED STATES PATENTS

| Number | Name | Date |
|---|---|---|
| 1,431,145 | Bolling | Oct. 10, 1922 |
| 1,512,741 | Barr | Oct. 21, 1924 |
| 1,550,422 | Braemer | Aug. 18, 1925 |
| 1,554,914 | Guthier | Sept. 22, 1925 |
| 1,624,639 | Thomasen | Apr. 12, 1927 |
| 1,805,173 | Griffoul | May 12, 1931 |
| 2,040,328 | Olson | May 12, 1936 |
| 2,156,295 | Kiesling | May 2, 1939 |
| 2,190,349 | Beam | Feb. 13, 1940 |
| 2,223,696 | Mayo | Dec. 3, 1940 |
| 2,237,248 | Denison | Apr. 1, 1941 |
| 2,238,318 | Goecke | Apr. 15, 1941 |
| 2,254,621 | Moore | Sept. 2, 1941 |
| 2,294,780 | Pfenning | Sept. 1, 1942 |
| 2,297,318 | Parkes | Sept. 29, 1942 |
| 2,312,479 | Ray | Mar. 2, 1943 |
| 2,318,027 | Sykes et al. | May 4, 1943 |
| 2,351,487 | Cooney | June 13, 1944 |